United States Patent
Kasprzak et al.

(10) Patent No.: US 7,295,935 B2
(45) Date of Patent: Nov. 13, 2007

(54) ANALYZING AND/OR DISPLAYING POWER CONSUMPTION IN REDUNDANT SERVERS

(75) Inventors: Keith James Kasprzak, Cedar Park, TX (US); Chih-Hsiung Huang, Taoyuan Hsien (TW)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 11/343,590

(22) Filed: Jan. 30, 2006

(65) Prior Publication Data

US 2007/0179723 A1 Aug. 2, 2007

(51) Int. Cl.
*G06F 1/00* (2006.01)

(52) U.S. Cl. .................. 702/63; 340/500; 340/635; 340/636.1; 340/636.15; 700/286; 700/295; 700/297; 702/57; 702/60; 702/64; 713/300; 713/330; 713/340

(58) Field of Classification Search ............... 340/500, 340/639.1, 635, 636.1, 636.15; 700/286, 700/295, 297; 702/57, 60, 64, 63; 713/300, 713/330, 340
See application file for complete search history.

(56) References Cited

U.S. PATENT DOCUMENTS

| | | | | |
|---|---|---|---|---|
| 2,871,374 A | * | 1/1959 | Early | 307/57 |
| 3,294,976 A | * | 12/1966 | Tipton et al. | 307/57 |
| 4,074,146 A | * | 2/1978 | Buonavita | 307/60 |
| 4,276,590 A | * | 6/1981 | Hansel et al. | 363/71 |
| 5,694,607 A | | 12/1997 | Dunstan et al. | 395/750 |
| 6,034,444 A | * | 3/2000 | Kuruma et al. | 307/80 |
| 6,385,024 B1 | * | 5/2002 | Olson | 361/87 |
| 6,496,438 B2 | * | 12/2002 | Saito | 365/226 |
| 6,714,016 B2 | * | 3/2004 | Odaohhara et al. | 324/427 |
| 2001/0017553 A1 | * | 8/2001 | Saito | 326/1 |
| 2002/0049920 A1 | | 4/2002 | Staiger | 713/340 |
| 2002/0116562 A1 | | 8/2002 | Mathuna et al. | 710/105 |
| 2003/0014161 A1 | | 1/2003 | Orthlieb et al. | 700/277 |
| 2003/0119560 A1 | | 6/2003 | Takatori et al. | 455/564 |
| 2003/0136019 A1 | | 7/2003 | Leap | 34/210 |
| 2003/0141907 A1 | * | 7/2003 | Canova et al. | 327/131 |
| 2001/0016789 A1 | | 8/2003 | Staiger | 701/1 |
| 2003/0205995 A1 | * | 11/2003 | Odaohhara et al. | 324/103 R |
| 2004/0100376 A1 | | 5/2004 | Lye et al. | 340/539.12 |
| 2004/0130446 A1 | | 7/2004 | Chen et al. | 340/359.12 |
| 2004/0162922 A1 | | 8/2004 | Kardach et al. | 710/15 |
| 2004/0163005 A1 | | 8/2004 | Kardach et al. | 713/323 |
| 2004/0172603 A1 | | 9/2004 | Collmeyer et al. | 716/1 |
| 2004/0252696 A1 | | 12/2004 | Kakishima et al. | 370/395.2 |
| 2004/0268166 A1 | | 12/2004 | Farkas et al. | 713/320 |
| 2005/0037756 A1 | | 2/2005 | Yaguchi et al. | 455/436 |
| 2005/0054389 A1 | | 3/2005 | Lee et al. | 455/574 |
| 2005/0059437 A1 | | 3/2005 | Son et al. | 455/574 |
| 2006/0209580 A1 | * | 9/2006 | Itakura et al. | 363/65 |
| 2007/0046281 A1 | * | 3/2007 | Domingo et al. | 324/142 |

* cited by examiner

*Primary Examiner*—Edward R Cosimano
(74) *Attorney, Agent, or Firm*—Baker Botts L.L.P.

(57) ABSTRACT

A method of analyzing power consumption in an information handling system is provided. A voltage associated with a current share signal may be determined. A power load associated with the information handling system may be determined based at least on the determined voltage associated with the current share signal. An indication of the determined power load may be visually displayed.

21 Claims, 3 Drawing Sheets

FIG. 2

| CURRENT SHARE SIGNAL VOLTAGE (V) | SERVER LOAD (%) | | | | |
|---|---|---|---|---|---|
| | ONE POWER SUPPLY | TWO POWER SUPPLIES | THREE POWER SUPPLIES | . . . | N POWER SUPPLIES |
| 0.0 | 0 | 0 | | . . . | |
| 0.5 | 5 | 10 | | . . . | |
| 1.0 | 10 | 20 | | . . . | |
| 1.5 | 15 | 30 | | . . . | |
| 2.0 | 20 | 40 | | . . . | |
| 2.5 | 25 | 50 | | . . . | |
| 3.0 | 30 | 60 | | . . . | |
| 3.5 | 35 | 70 | | . . . | |
| 4.0 | 40 | 80 | | . . . | |
| 4.5 | 45 | 90 | | . . . | |
| 5.0 | 50 | 100 | | . . . | |
| 5.5 | 55 | | | . . . | |
| 6.0 | 60 | | | . . . | |
| 6.5 | 65 | | | . . . | |
| 7.0 | 70 | | | . . . | |
| 7.5 | 75 | | | . . . | |
| 8.0 | 80 | | | . . . | |
| 8.5 | 85 | | | . . . | |
| 9.0 | 90 | | | . . . | |
| 9.5 | 95 | | | . . . | |
| 10.0 | 100 | | | . . . | |

| PS1 DATA | | | PS2 DATA | | | CURRENT SHARING |
|---|---|---|---|---|---|---|
| PRESENT | ON | POWER OK | PS1 CURRENT? | PRESENT | ON | POWER OK | PS2 CURRENT? | |
| 0 | X | X | X | 1 | 1 | 1 | PS2 CURRENT | PS2 CURRENT |
| 1 | 0 | X | X | 1 | 1 | 1 | PS2 CURRENT | PS2 CURRENT |
| 1 | 1 | 1 | PS1 CURRENT | 1 | 1 | 1 | PS2 CURRENT | PS1 CURRENT + PS2 CURRENT |
| 1 | 1 | 1 | PS1 CURRENT | 0 | X | X | X | PS1 CURRENT |
| 1 | 1 | 1 | PS1 CURRENT | 1 | 0 | X | X | PS1 CURRENT |

210  212  214  230  220  222  224  232  234

200

ANALYZING AND/OR DISPLAYING POWER CONSUMPTION IN REDUNDANT SERVERS

TECHNICAL FIELD

The present disclosure relates generally to information handling systems and, more particularly, to analyzing and/or displaying power consumption in redundant servers.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, e.g., servers, are often configured to redundant power supplies such that the number of power supplies supplying power to a system can be changed over time. For example, a particular server may be powered by a single power supply or by multiple power supplies, as desired by a user.

In addition, information handling systems typically do not have a satisfactory method or system for analyzing, managing, and/or displaying power consumption of power supplies providing power to a system. This often leads to problems in development and production, and/or fails to provide customers with important information regarding the operation of their systems.

SUMMARY

Therefore, a need has arisen for systems and methods for analyzing and/or displaying power consumption in redundant servers, e.g., in a manner which is easily understandable by a user (e.g., a customer).

In accordance with one embodiment of the present disclosure, a method of analyzing power consumption in an information handling system is provided. A voltage associated with a current share signal may be determined. A power load associated with the information handling system may be determined based at least on the determined voltage associated with the current share signal. An indication of the determined power load may be visually displayed.

In accordance with another embodiment of the present disclosure, logic encoded in computer-readable media and executable by a processor may include logic for determining a voltage associated with a current share signal; logic for determining a power load associated with the information handling system based at least on the determined voltage associated with the current share signal; and logic for causing an indication of the determined power load to be visually displayed.

In accordance with yet another embodiment of the present disclosure, an information handling system includes a voltage detection module and a power management module. The voltage detection module may be operable to determine a voltage associated with a current share signal. The power management module may be communicatively coupled to the voltage detection module and may be operable to determine a power load associated with the information handling system based at least on the determined voltage associated with the current share signal, and to cause an indication of the determined power load to be visually displayed.

One technical advantage of the present disclosure is that systems and methods are provided for determining and/or displaying the load, or power consumption, of an information handling system, e.g., a server). For example, the load may be displayed as a percentage of the maximum load of the server. In some embodiments, the load may be displayed in real-time or substantially in real-time. Providing a display of the server load may allow a user to manage a power supply situation as desired, e.g., to efficiently distribute power supplies among multiple servers. For example, in a system of multiple servers, if a user notices that one server is consistently running at a low load level, the user may move one or more power supplies connected to that server to one or more other servers experiencing higher loads.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates an example look-up table for determining a power load of a server, according to one embodiment of the disclosure;

DETAILED DESCRIPTION

Preferred embodiments and their advantages are best understood by reference to FIGS. 1-4, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Although the following discussion focuses on a particular type of information handling system, servers, it should be understood that some or all of the systems and methods discussed herein may be similarly used in connection with any other suitable types of information handling system.

Figure 1:
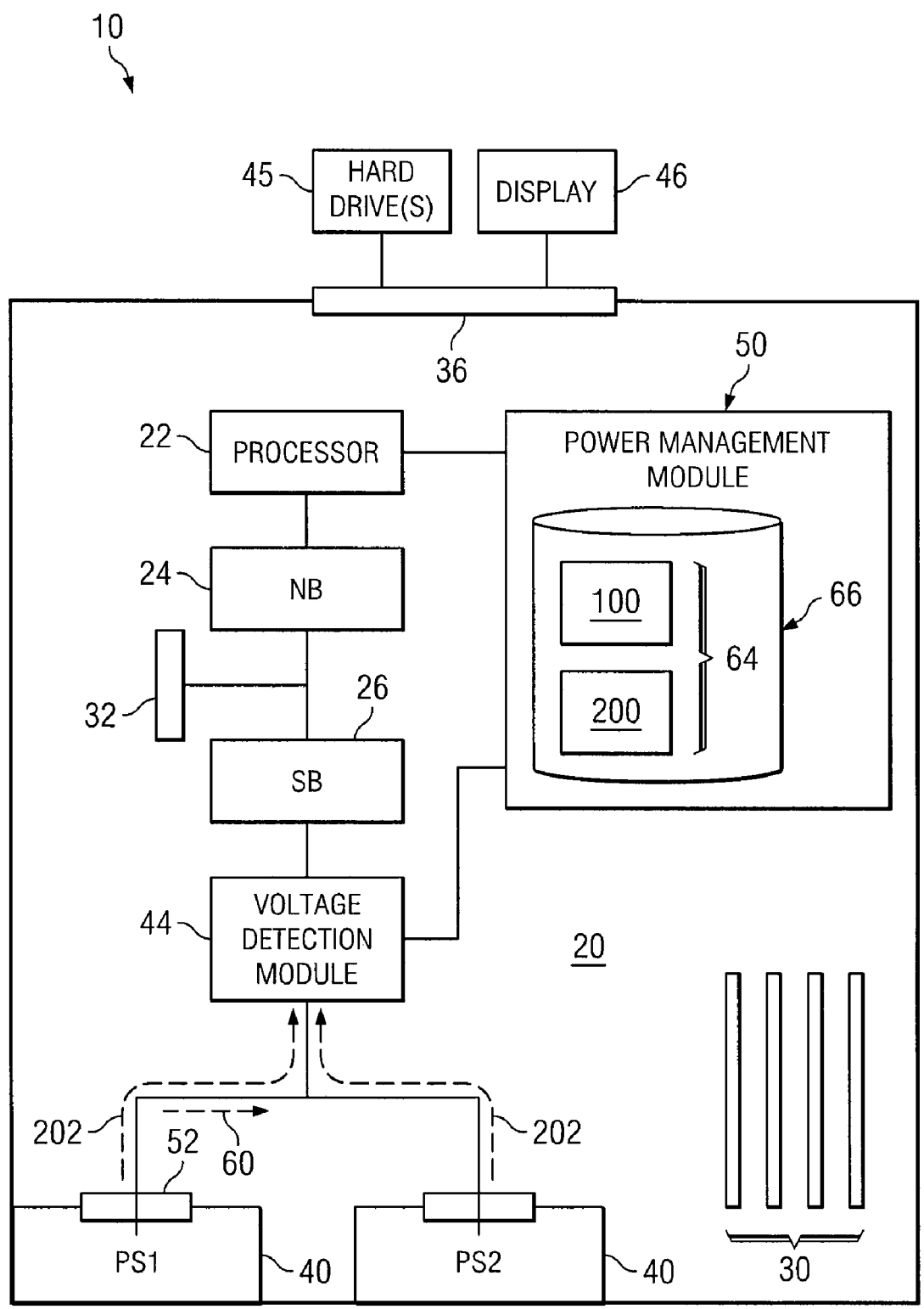
FIG. 1 illustrates an example information handling system configured to analyze and/or display system power consumption, according to one embodiment of the present disclosure.

FIG. 1 illustrates an example information handling system 10 configured to analyze and/or display system power consumption, according to one embodiment of the present disclosure. In some embodiments, information handling system 10 may be a server 10. However, in other embodiments, system 10 may be any other type of information handling system.

Server 10 may include a motherboard 20, one or more processors 22, a Northbridge chipset 24, a Southbridge chipset 26, one or more DIMM or other memory slots 30, one or more PCI cards (e.g., PCI Express cards) 32, a backplane 36, one or more power supplies 40, a voltage detection module 44, and/or a power management module 50. One or more devices may be connected to backplane 36, such as one or more hard drives 45 and a display 46. Server 10 may also include any number and/or type of other suitable components of a server or other information handling system. In addition, in some embodiments, server 10 may exclude one or more of the components discussed herein.

Processor(s) 22 may include any one or more microprocessors or any other suitable type of processors. DIMM slots 30 may be configured to receive one or more memory cards or devices, e.g., RAM cards.

Power supplies 40 may include one or more permanent and/or one or more removable devices, e.g., batteries. For example, a power supply may be a 12V battery configured to be removably attached to server 10. A power supply 40 may be connected to motherboard 20 via an output connector 52, which may include any suitable number of blades and/or signal pins (e.g., 24 pins).

Server 10 may be configured for a redundant power supply with active current sharing. Thus, the number of power supplies 40 supplying power to server 10 may be changed over time and/or as desired, such as if a user adds or removes one or more power supplies 40. For example, server 10 may be powered by a single power supply 40 or by multiple power supplies 40, e.g., based on power requirements and/or availability.

In a redundant power supply configuration with active current sharing, a "current share signal" may be used to manage the sharing of power being supplied to server 10 by multiple power supplies 40. A current share signal is indicated in FIG. 1 at 60. The current share signal 60 may be defined as the voltage of the power supply 40 having the highest voltage, which may be referred to as the master power supply. Thus, the master power supply may dictate the current share signal 60.

In some embodiments, the current share signal 60 may be used to ensure that multiple power supplies 40 are sharing the power load relatively evenly. For example, a particular current share signal 60 may be used to ensure that each of the multiple power supplies 40 is sharing the power load within a factor of 5% of the maximum current output of a particular power supply 40.

For example, in the example configuration shown in FIG. 1, two power supplies 40, PS1 and PS2, are currently connected to, and supplying power to, server 10. If PS1 and PS2 are capable of supplying 100A, the current share signal 60 may ensure that the amount of current being supplied by PS1 and PS2 is within 5A of each other.

Power supply signal 60 may originate within the master power supply 40. Power supply signal 60 may then run between multiple power supplies 40 via one or more links provided through one or more signal pins of output connectors 52 associated with the power supplies 40.

In order to regulate the current being supplied by each power supply 40, the current share signal 60 may compared to an internal voltage of a particular non-master power supply 40 in order to determine whether the voltage of a particular non-master power supply is within the allowable range of voltage as compared to the voltage of the master power supply (i.e., the voltage of the current share signal 60). If the voltage of the particular non-master power supply is outside the allowable range, particular non-master power supply may adjust its output voltage (such that more current is drawn from that power supply) in order to fall within the allowable range. Such process may be referred to as active current sharing.

Voltage detection module 44 may be operable to detect the voltage of the current share signal 60 associated with the one or more power supplies 40 currently supplying power to server 10. Voltage detection module 44 may be separate from, or partially or completely integrated with one or more previously discussed components of server 10, e.g., power management module 50.

In some embodiments (e.g., as shown in FIG. 1), voltage detection module 44 may be separate from, or located externally from, the one or more power supplies 40. In such embodiments, voltage detection module 44 may tap into (i.e., read the voltage of) current share signal 60 at a location outside of power supplies 40, e.g., at a link provided between power supplies 40, such as shown in FIG. 1, for example.

In other embodiments, voltage detection module 44 may be integrated with, or located within, a power supply 40. In such embodiments, voltage detection module 44 may tap into (i.e., read the voltage of) current share signal 60 at a location within the power supply 40 (e.g., the master power supply).

Power management module 50 may be communicatively coupled to voltage detection module 44 and/or one or more processors 22, and may be generally operable to analyze, determine, and/or display the load, or power consumption, of server 10. Power management module 50 may include any suitable software, firmware and/or hardware for providing any of the functionality discussed herein.

In some embodiments, power conversion data 64 may be stored in one or more memory devices 66 associated with, or accessible by, power management module 50. Power conversion data 64 may include data that may be used for converting the measure of a voltage detected from current share signal 60 into a measure of a power load associated with server 10 (i.e., a measure of the power consumption of server 10). For example, in some embodiments, power conversion data 64 may include one or more look-up tables for converting a current share signal voltage into a server power load, e.g., as discussed below with reference to tables 100 and/or 200 shown in FIGS. 2 and 3. In other embodiments, power conversion data 64 may include one or more charts and/or algorithms (e.g., algebraic formulas) for converting a current share signal voltage into a server power load.

Display 46 may be generally operable to display to a user (e.g., a customer, technician, IT personnel, developer, etc.) an indication of one or more power parameters of server 10, e.g., a measure of the loading of server 10. For example, display 46 may indicate the percentage loading of server 10. For example, display 46 may display that server 10 is currently 65% loaded. In some embodiments, display 46 may be updated in real-time or substantially in real-time such that the real-time power consumption of server 10 may be displayed. Display 46 may include any device suitable to communicate to a user an indication of such power parameter(s), such as a graphical user interface (GUI), a control panel (e.g., an LCD panel), a screen, one or more LED or other lights, etc.

FIG. 2 illustrates an example look-up table 100 for determining a power load of a server 10, according to one embodiment of the disclosure. In some embodiments, look-up table 100 may be used by power management module 50 for determining a power load of a server 10 based at least on (a) the voltage of current share signal 60 (e.g., as detected by voltage detection module 44) and/or (b) the number of power supplies supplying current to server 10 (which in some embodiments, may be determined using another look-up table, e.g., as described below with reference to FIG. 3).

In some embodiments, look-up table 100 may include, for each of a plurality of different numbers of power supplies 40 currently supplying power to server 10, data that relates or corresponds values for current share signal voltages to power loads for server 10.

Table 100 shown in FIG. 2 includes a first column 110 indicating a range of voltages for current share signal 60, a second column 112 indicating a power load of server 10 when a single power supply 40 is supplying power, a third column 114 indicating a power load of server 10 when two power supplies 40 are supplying power, and/or one or more additional columns 116 indicating a power load of server 10 when other numbers (i.e., greater than two) of power supplies 40 are supplying power.

The values in column 110 may include a range of values for the voltage detected from current share signal 60. The range of voltages may be defined by a maximum power consumption of server 10, and may have any number of incremental values within the range. In this example, the range of voltages extends from 0V to 10V at intervals of 0.5V.

The values in column 112 may include a range of values indicating the power load of server 10 when a single power supply 40 is supplying power to server 10. In some embodiments, such as shown in FIG. 2, the values in column 112 may be percentage values indicating the percentage of the maximum load of server 10 that server 10 is currently drawing. In other embodiments, the values in column 112 may be other types of values (e.g., amps) that indicate the current load consumption of server 10.

The values in column 114 may include a range of values indicating the power load of server 10 when two power supplies 40 are supplying power to server 10. In some embodiments, such as shown in FIG. 2, the values in column 114 may be percentage values indicating the percentage of the maximum load of server 10 that server 10 is currently drawing. In other embodiments, the values in column 114 may be other types of values (e.g., amps) that indicate the current load consumption of server 10.

The values in column(s) 116 may include ranges of values indicating the power load of server 10 when other numbers (i.e., greater than two) of power supplies 40 are supplying power, which may be similar in principal to columns 112 and 114.

The number of power supplies 40 supplying current to server 10 may be determined in any suitable manner. In some embodiments, the number of power supplies 40 supplying current to server 10 may be determined based on (a) status signals received from one or more power supplies 40 and (b) a look-up table 200, as discussed below with reference to FIG. 3. The determined number of power supplies 40 supplying current to server 10 may be used for selecting the appropriate column (e.g., column 112 or 114) of look-up table 100 for determining the power load of server 10.

In other embodiments, data for relating or corresponding current share signal voltages to power loads for server 10 may be otherwise stored. For example, instead of using data table(s), such data may be stored in one or more graphs and/or using one or more algorithms, e.g., algebraic equations. For example, a memory device 66 may store one or more algorithms for determining the power load of server 10 based on (a) the voltage of current share signal 60 and/or (b) the number of power supplies supplying current to server 10.

The number of power supplies 40 supplying current to server 10, which number may be used for selecting the appropriate column (e.g., column 112 or 114) of look-up table 100, may be determined in any suitable manner. For example, in some embodiment, the number of power supplies 40 supplying current to server 10 may be determined by receiving one or more status signals regarding the status of one or more power supplies 40, and accessing a look-up table 200 for determining the appropriate number of power supplies 40 based on the received status signals.

Figures 3, 4:
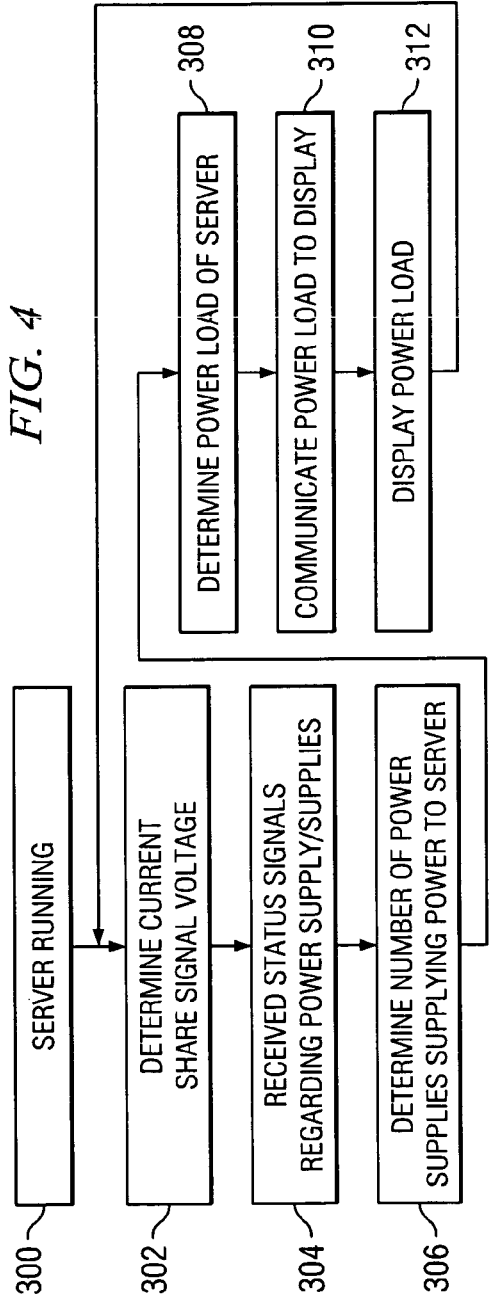
FIG. 3 illustrates an example look-up table for determining a number of power supplies supplying current to a server, according to one embodiment of the disclosure.
FIG. 4 illustrates an example method of determining and displaying the power load of a server, according to one embodiment of the disclosure.

FIG. 3 illustrates an example look-up table 200 for determining a number of power supplies 40 supplying current to server 10, according to one embodiment of the disclosure. In some embodiments, look-up table 200 may be used by power management module 50 to determine the appropriate number of power supplies 40 for selecting the appropriate column (e.g., column 112 or 114) of look-up table 100 for determining the power load of server 10, as discussed above.

Power management module 50 may receive one or more status signals 202 (see FIG. 1) regarding the status of one or more power supplies 40, and use look-up table 200 to determine the number of power supplies 40 supplying current to server 10 based on such status signals 202. Such status signals 202 may include, e.g., (a) a "present" signal indicating whether a power supply is physically connected to (e.g., plugged into) server 10, (b) an "on" signal indicating whether the power supply is on or off, and/or (c) a "power ok" signal indicating that the power supply is running or running properly (e.g., providing proper output voltage). One or more status signals 202 may be generated by power supplies 40 themselves and/or from other components of server 10. In other embodiments, one or more other signals may be used for determining the number of power supplies 40 providing power to server 10.

Example table 200 may be used to determine whether one or two power supplies 40 (e.g., PS1 and/or PS2) are supplying current to server 10. Table 200 may include a column 210 corresponding to the "present" signal for PS1, a column 212 corresponding to the "on" signal for PS1, a column 214 corresponding to the "power ok" signal for PS1, a column 220 corresponding to the "present" signal for PS2, a column 222 corresponding to the "on" signal for PS2, and/or a column 224 corresponding to the "power ok" signal for PS2.

Column 230 may indicate whether PS1 is supplying current to server 10, based on the values in columns 210, 212, and 214 (i.e., column 230 indicates that PS1 is providing power if the values in each of columns 210, 212, and 214 is "1"). Similarly, column 232 may indicate whether PS2 is supplying current to server 10, based on the values in columns 220, 222, and 224 (i.e., column 232 indicates that PS2 is providing power if the values in each of columns 220, 222, and 224 is "1"). Column 234 may indicate which of PS1 and/or PS2 are supplying current to server 10. The number of power supplies 40 listed in column 234 may be used as input for look-up table 100, as discussed above.

In other embodiments, data for determining the number of power supplies 40 delivering power to server 10 may be otherwise stored. For example, instead of using a data table, such data may be stored in one or more graphs and/or using one or more algorithms.

FIG. 4 illustrates an example method of determining and displaying the power load of server 10, according to one embodiment of the disclosure. At step 300, server 10 is running with one or more power supplies 40 providing power to server 10 in an active current sharing configuration. In this example, suppose that two power supplies—PS1 and PS2 are currently connected to, and supplying power to, server 10.

At step 302, the voltage of current share signal 60 running between PS1 and PS2 may be determined by voltage detection module 44 and communicated to power management module 50. At step 304, one or more status signals 202 regarding the status of PS1 and/or PS2 may be communicated to power management module 50.

At step 306, power management module 50 may determine the number of power supplies 40 supplying power to server 10 using look-up table 200 and based on status signals 202 received at step 304. At step 308, power management module 50 may determine the power load of server 10 using look-up table 100 and based on (a) the voltage of current share signal 60 determined at step 302 and/or (b) the number of power supplies 40 determined at step 306. For example, power management module 50 may determine a percentage loading of server 10. At step 310, power management module 50 may communicate the determined power load to display 46 in any suitable manner. At step 312, display 46 may display the power load in any suitable manner understandable by a user. For example, display 46 may display a percentage loading via a graphical user interface (GUI), a control panel (e.g., an LCD panel), a screen, one or more LED or other lights, or in any other suitable manner. In some embodiments, this process may be performed in a continuous loop such that the power load of server 10 is dynamically determined and/or displayed in real-time or substantially in real-time.

Although the disclosed embodiments have been described in detail, it should be understood that various changes, substitutions and alterations can be made to the embodiments without departing from their spirit and scope.

What is claimed is:

1. A method of analyzing power consumption in an information handling system, comprising:
   determining a voltage associated with a current share signal;
   determining a number of power supplies supplying current to the information handling system;
   determining a power load associated with the information handling system based at least on the determined voltage associated with the current share signal and the determined number of power supplies supplying current to the information handling system; and
   causing an indication of the determined power load to be visually displayed for use by a user in managing power supplies.

2. A method according to claim 1, wherein determining the power load associated with the information handling system comprises accessing a look-up table that relates current share signal voltages to system power loads.

3. A method according to claim 1, wherein:
   the current share signal is associated with a power supply; and
   determining a voltage associated with a current share signal comprises reading a current share signal at a location external to the power supply.

4. A method according to claim 1, wherein:
   the current share signal is associated with a power supply; and
   determining a voltage associated with a current share signal comprises reading a current share signal at a location within the power supply.

5. A method according to claim 1, wherein:
   determining a power load associated with the information handling system comprises determining a percentage loading of the information handling system; and
   causing an indication of the determined power load to be visually displayed comprises causing the determined percentage loading of the information handling system to be visually displayed.

6. A method according to claim 1, further comprising:
   receiving one or more status signals regarding the status of one or more power supplies;
   determining a number of power supplies cooperating to supply current to the information handling system based at least on the one or more received status signals; and
   determining the power load associated with the information handling system based on both the determined voltage associated with the current share signal and the determined number of power supplies cooperating to supply current to the information handling system.

7. A method according to claim 1, further comprising:
   determining a number of power supplies supplying current to the information handling system; and
   determining the power load associated with the information handling system based on both the determined voltage associated with the current share signal and the determined number of power supplies supplying current to the information handling system.

8. A method according to claim 7, wherein determining the power load associated with the information handling system comprises:
   accessing a look-up table that includes, for each of a plurality of different numbers of power supplies, data relating current share signal voltages to system power loads; and using the look-up table to determine a power load corresponding to the determined voltage associated with the current share signal and the determined number of power supplies supplying current to the information handling system.

9. Logic encoded in computer-readable media and executable by a processor, comprising:
   logic encoded in computer-readable media for determining a voltage associated with a current share signal;
   logic encoded in computer-readable media for determining a number of power supplies supplying current to the information handling system;
   logic encoded in computer-readable media for determining a power load associated with the information handling system based at least on the determined voltage associated with the current share signal and the determined number of power supplies supplying current to the information handling system; and
   logic encoded in computer-readable media for causing an indication of the determined power load to be visually displayed for use by a user in managing power supplies.

10. Logic according to claim 9, wherein the logic for determining the power load associated with the information handling system comprises logic for accessing a look-up table that relates current share signal voltages to system power loads.

11. Logic according to claim 9, wherein:
   the logic for determining a power load associated with the information handling system comprises logic for determining a percentage loading of the information handling system; and
   the logic for causing an indication of the determined power load to be visually displayed comprises logic for causing the determined percentage loading of the information handling system to be visually displayed.

12. Logic according to claim 9, further comprising:
   logic for receiving one or more status signals regarding the status of one or more power supplies;
   logic for determining a number of power supplies cooperating to supply current to the information handling system based at least on the one or more received status signals; and
   logic for determining the power load associated with the information handling system based on both the determined voltage associated with the current share signal and the determined number of power supplies cooperating to supply current to the information handling system.

13. Logic according to claim 9, further comprising:
   logic for determining a number of power supplies supplying current to the information handling system; and
   logic for determining the power load associated with the information handling system based on both the determined voltage associated with the current share signal and the determined number of power supplies supplying current to the information handling system.

14. Logic according to claim 13, wherein the logic for determining the power load associated with the information handling system comprises:
   logic for accessing a look-up table that includes, for each of a plurality of different numbers of power supplies, data relating current share signal voltages to system power loads; and
   logic for using the look-up table to determine a power load corresponding to the determined voltage associated with the current share signal and the determined number of power supplies supplying current to the information handling system.

15. An information handling system, comprising:
   a voltage detection module for determining a voltage associated with a current share signal; and
   a power management module communicatively coupled to the voltage detection module and operable to:
      determine a number of power supplies supplying current to the information handling system;
      determine a power load associated with the information handling system based at least on the determined voltage associated with the current share signal and the number of power supplies supplying current to the information handling system; and
   cause an indication of the determined power load to be visually displayed for use by a user in managing power supplies.

16. An information handling system according to claim 15, further comprising a memory device operable to store a look-up table that relates current share signal voltages to system power loads; and
   wherein the power management module is operable to access the look-up table to determining a power load corresponding to the determined voltage associated with the current share signal.

17. An information handling system according to claim 15, further comprising:
   a power supply associated with the current share signal; and
   the voltage detection module is operable to read the current share signal at a location external to the power supply.

18. An information handling system according to claim 15, further comprising:
   a power supply associated with the current share signal; and
   the voltage detection module is operable to read the current share signal at a location within the power supply.

19. An information handling system according to claim 15, further comprising:
   the power management module operable to determine a percentage loading of the information handling system; and
   a display device communicatively coupled to the power management module and operable to display an indication of the determined power load.

20. An information handling system according to claim 15, further comprising the power management module operable to determine a number of power supplies supplying current to the information handling system, and determine the power load associated with the information handling system based on both the determined voltage associated with the current share signal and the determined number of power supplies supplying current to the information handling system.

21. An information handling system according to claim 20, further comprising a memory device operable to store a look-up table that includes, for each of a plurality of different numbers of power supplies, data relating current share signal voltages to system power loads; and
   wherein the power management module is operable to access the look-up table to determine a power load corresponding to the determined voltage associated with the current share signal and the determined number of power supplies supplying current to the information handling system.

* * * * *